(12) United States Patent
Wilms et al.

(10) Patent No.: US 8,049,939 B2
(45) Date of Patent: Nov. 1, 2011

(54) METHOD, APPARATUS AND COMPUTER PROGRAM FOR GENERATING TRANSFER FUNCTIONS TO BE USED IN A PRINTIING SYSTEM

(75) Inventors: Maurice G. M. Wilms, Fanningen (NL); Remco Hammen, Venlo (NL)

(73) Assignee: Oce-Technologies B.V., Venlo (NL)

( * ) Notice: Subject to any disclaimer, the term of this patent is extended or adjusted under 35 U.S.C. 154(b) by 978 days.

(21) Appl. No.: 11/525,916

(22) Filed: Sep. 25, 2006

(65) Prior Publication Data
US 2007/0070467 A1    Mar. 29, 2007

(30) Foreign Application Priority Data

Sep. 23, 2005    (EP) .................... 05108802

(51) Int. Cl.
H04N 1/46    (2006.01)
H04N 1/407    (2006.01)
H04N 1/409    (2006.01)
(52) U.S. Cl. ...................... 358/504; 358/3.26
(58) Field of Classification Search .......... 358/504, 358/518, 519, 3.13, 1.9, 3.26, 520; 382/165
See application file for complete search history.

(56) References Cited

U.S. PATENT DOCUMENTS

| 7,050,196 B1 * | 5/2006 | Piatt et al. | 358/1.9 |
| 2003/0025925 A1 * | 2/2003 | Elsman et al. | 358/1.9 |
| 2004/0145757 A1 * | 7/2004 | Marsden et al. | 358/1.9 |

FOREIGN PATENT DOCUMENTS

| EP | 1168822 A1 | 1/2002 |
| JP | 64-45644 U | 3/1989 |
| JP | 2003-338939 A | 11/2003 |

* cited by examiner

*Primary Examiner* — James A Thompson
(74) *Attorney, Agent, or Firm* — Birch Stewart Kolasch & Birch, LLP

(57) ABSTRACT

A method of generating transfer functions to be applied to the input data of an image to be printed by a printing apparatus using a group of colorants, each colorant being assigned to the rendering of a distinct color channel, includes determining a maximum total area coverage and measuring the tonal response of each colorant. The method further includes setting a maximum individual area coverage for each colorant such that the optical density at the maximum individual area coverage is substantially the same for each colorant and the sum of the maximum individual area coverage values is substantially equal to the maximum total area coverage and generating a transfer function for each color channel based on the set maximum individual area coverage for the assigned colorant. An apparatus and a computer program product are provided to generate such transfer functions.

17 Claims, 4 Drawing Sheets

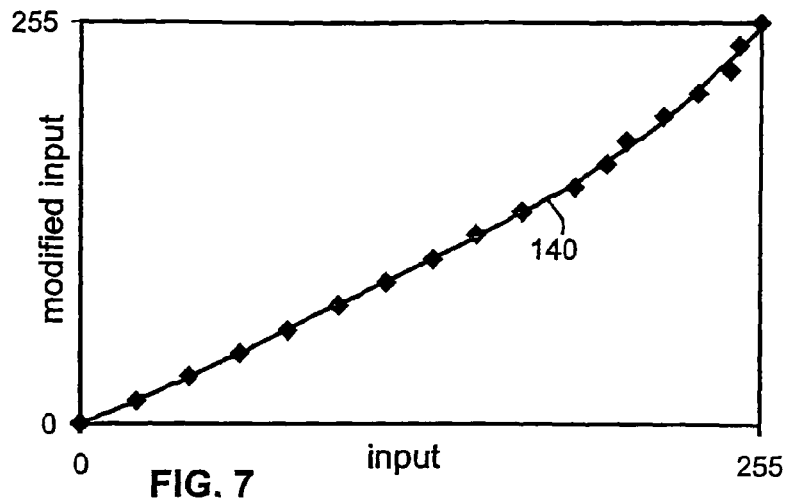
FIG. 7
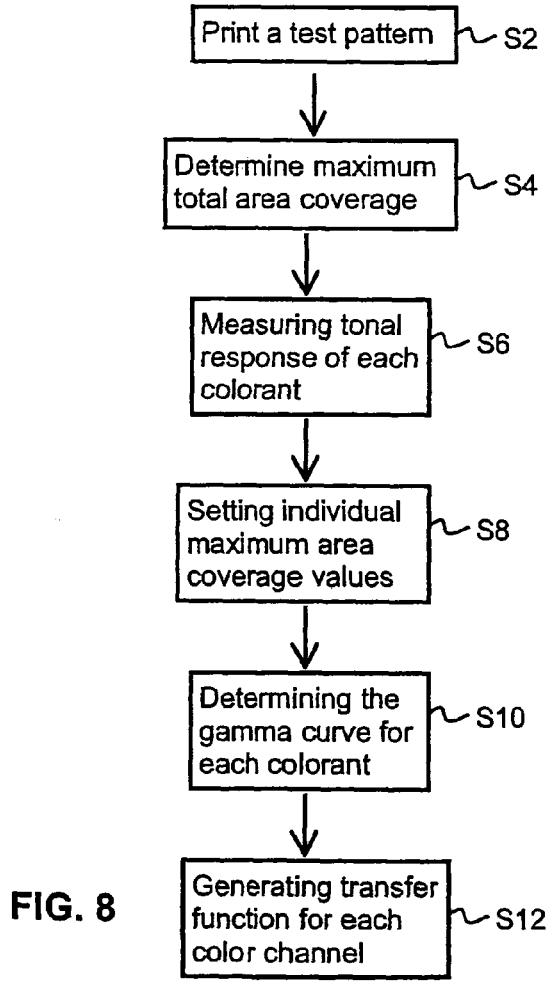
FIG. 5
FIG. 8

METHOD, APPARATUS AND COMPUTER PROGRAM FOR GENERATING TRANSFER FUNCTIONS TO BE USED IN A PRINTIING SYSTEM

CROSS-REFERENCE TO RELATED APPLICATIONS

This nonprovisional application claims priority under 35 U.S.C. §119(a) on European Patent Application No. 05108802.9, filed on Sep. 23, 2005, the entirety of which is incorporated herein by reference.

BACKGROUND OF THE INVENTION

1. Field of the Invention

The present invention relates to a method of generating transfer functions to be applied to the input data of an image to be printed by a printing apparatus using a group of colorants, each colorant being assigned to the rendering of a distinct color channel. The method includes the steps of determining a maximum total area coverage and measuring the tonal response of each colorant.

2. Description of Background Art

In many digital printing systems, dither patterns are used to create tone gradation. Some inkjet printing systems use three primary colorants in the form of cyan, magenta and yellow inks. These three colorants form a group of colorants. High quality printing systems may use the group of primary colorants, combined with a black colorant, or even more colorants. With dither patterns, it is possible to achieve on the print media a desired area coverage of a colorant for the purpose of rendering an input value of a given color channel. Typically, there is a non-linear relationship between the area coverage of a colorant deposited on the print media and the obtained optical density of the printed color. The input data of each color channel of an image to be printed must be corrected in order to obtain a desired output response of the printer. Most of the time, the correction is carried out such that the corrected input data appear to have a linear tone scale. Transfer functions are applied to input data of each color channel of an image to be printed to carry out the modification. A transfer function can be described by a polynomial function to be applied to the raw input data, or by using a look-up table, wherein modified input data are associated with raw input data.

In such printing systems, it is common practice to include colorant limitation methods or devices that make it possible to limit the amount of colorants deposited on the print media to a maximum total area coverage. Such limitation methods or devices are required to avoid excessive use of colorants. If excessive colorant is used, undesirable effects such as bleeding (an undesirable mixing of colorants along a boundary between printed areas of different colorants), cockling (warping or deformation of the print media), flaking and smearing may occur. This can lead to unacceptable print results, and even worse, may cause the print media to warp so much that it may damage mechanical parts of the printing apparatus. Therefore, a maximum total area coverage value is determined, depending on the colorants properties, print media properties, print applications printing conditions, etc.

A method for generating transfer functions of the above type is known from EP 1168822 A1. With the known method, once an operator has determined an overall upper ink limit (i.e. a maximum total area coverage) from a test pattern, individual ink limits (i.e. maximum individual area coverage values) are derived by dividing the total ink limit by three and apply the result to all colorants in the system. With the known method, the same maximum individual area coverage is thus attributed to each colorant. With the knowledge of the tonal scale curves and of the maximum individual area coverage value, the transfer functions can then be generated.

When using the known method, it appears that some printed colors are not saturated enough. A part of the gamut cannot be rendered by the printing apparatus in a satisfactory fashion, which can lead to very disappointing print results.

SUMMARY OF THE INVENTION

The present invention seeks to provide a method in which some colors can be rendered with a higher value of the saturation and in which the quality of printed images is improved.

In accordance with an embodiment of the present invention, there is provided a method further comprising the steps of: setting a maximum individual area coverage for each colorant such that the optical density at the maximum individual area coverage is substantially the same for each colorant and the sum of the maximum individual area coverage values is substantially equal to the maximum total area coverage; and generating a transfer function for each color channel based on the set maximum individual area coverage for the assigned colorant.

Thus, a part of the gamut, which could not be rendered with the known method, can now be achieved. Indeed, some colorants of the groups are attributed a higher maximum individual area coverage value than with the known method. Therefore, the shape of the rendered gamut is changed with respect to the known method. This results in an increased quality of printed images. With the method according to the present invention, some colors can be rendered with a higher value of the saturation.

The invention also relates to an apparatus for generating transfer functions to be applied to the input data of an image to be printed by a printing apparatus using a group of colorants, each colorant being assigned to the rendering of a distinct color channel. According to an embodiment of the invention the apparatus comprises receiving means, storing means and reading means adapted to receive, store and read data comprising a pre-determined maximum total area coverage and a measured tonal response of each colorant, a colorant limiter adapted to set the maximum individual area coverage values such that the optical density at each maximum individual area coverage is substantially the same for each colorant and such that the sum of the maximum individual area coverage values is substantially equal to the maximum total area coverage and a transfer function generator for generating a transfer function for each color channel based on the set maximum individual area coverage for the assigned colorant.

The present invention also relates to a computer program product residing on a computer readable medium comprising instructions for causing at least one process unit to perform the generation of transfer functions to be applied to the input data of an image to be printed by a printing apparatus using a group of colorants, each colorant being assigned to the rendering of a distinct color channel.

According to an embodiment of the present invention, the program comprises instructions for receiving, storing and reading data comprising a pre-determined maximum total area coverage and a measured tonal response of each colorant, colorant limiting instructions for setting maximum individual area coverage values such that the optical density at each maximum individual area coverage is substantially the same for each colorant and the sum of the maximum individual area coverage values is substantially equal to the maximum total area coverage and instructions for generating a transfer function for each color channel based on the set maximum individual area coverage for the assigned colorant.

The present invention has been described for an inkjet printing system. However, the present invention is also applicable a printing system that uses a variety of different technologies to transfer colorant on a print media, including inkjet, thermal dye transfer, thermal wax, electrophotography, silver halide and other processes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a table showing the measured optical density (OD) for the colorants cyan (C), yellow (Y) and magenta (M) as a function of the individual area coverage (AC);

FIG. 7 is a graphic representation illustrating the transfer function for the color channel cyan, obtained from the tonal response of the colorant cyan and from the individual maximum area coverage set according to the method of the present invention;

FIG. 8 is a flow diagram showing a method according to an embodiment of the present invention;

DETAILED DESCRIPTION OF THE PREFERRED EMBODIMENTS

Figure 1:
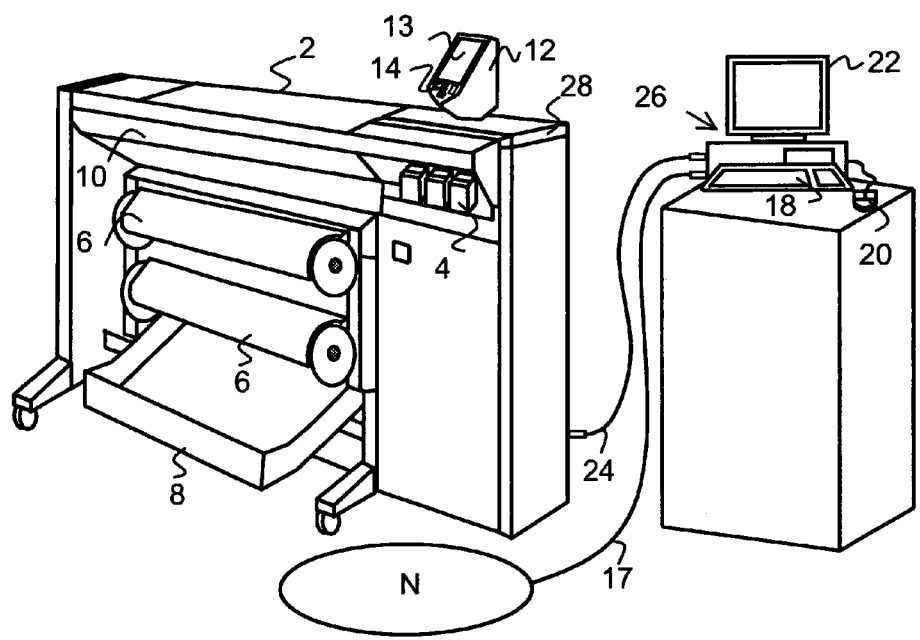
FIG. 1 is a schematic diagram of a printing apparatus to which the method according to an embodiment of the present invention can be applied.

FIG. 1 shows a printing apparatus to which the method according to an embodiment of the present invention can be applied. In FIG. 1, a print engine 2 is connected to a print server 26 through a connection cable 24. The print server 26 is further connected to a network N, the connection being diagrammatically shown in the form of a cable 17. The print server 26 receives the print jobs and converts them in a format that can be processed by the print engine 2. The print server 26 ensures, in co-operation with a control unit 28 placed inside the print engine 2, that images to be printed in accordance with print jobs are printed on a print media. The print server 26 is also provided with a display 22, such as a monitor and with an input device, such as a keyboard 18 and a mouse 20.

In the example shown in FIG. 1, printing is achieved using a wide format inkjet printer provided with three different basic colorants, such as cyan, magenta and yellow inks, forming a group of primary colorants. The colorants are stored in three ink containers 4 for supplying ink to the ink jet printhead. The images are printed on an ink-receiving medium (print media), such as a sheet of paper supplied by any of the paper rolls 6. Printed sheets of papers are deposited in the delivery tray 8. A local user interface unit 12 integrated in the print engine is provided with a display screen 13 and a key panel 14. The housing 10 contains the printhead (not shown), which is mounted on a carriage for printing swaths of images.

In the methods of generating transfer functions described hereinafter, it is assumed that the used printing technology is inkjet printing, using three primary colorants cyan, magenta and yellow in the form of inks. However, it will be clear to one having ordinary skill in the art that other printing technologies can be used.

The known method (EP 1168822 A1) comprises printing a test pattern on the print media under the same operational conditions as an actual print job for which the generation of the gamma curves is done. The test pattern is designed to quantify the characteristics of the interaction between the print media and the colorants.

A test pattern usually contains patches on which equal quantities of each colorant are printed in an additive fashion in order to easily determine a maximum total area coverage by the colorants, i.e. the maximum acceptable ink load. The total area coverage is defined as the total build-up of ink on a given spot on the paper. An area where 50 percent cyan is combined with 50 percent yellow and 50 percent magenta has a total area coverage of 150 percent. The maximum total area coverage is selected upon visually inspecting the aspect of the printed patches containing equal quantities of each colorant. The inks interact with the print media and with each other. Above a certain total ink load, problems appear, such as paper cockle, bleed between the colors, show through, etc. The determined maximum total area coverage, i.e. the maximum acceptable ink load limit may vary, depending on the kind of print applications the generation of the transfer functions is done for. Paper cockle may be very critical for image graphics applications. By way of example, it is assumed in the rest of the description that the determined maximum total area coverage is equal to 215 percent.

Figure 2:
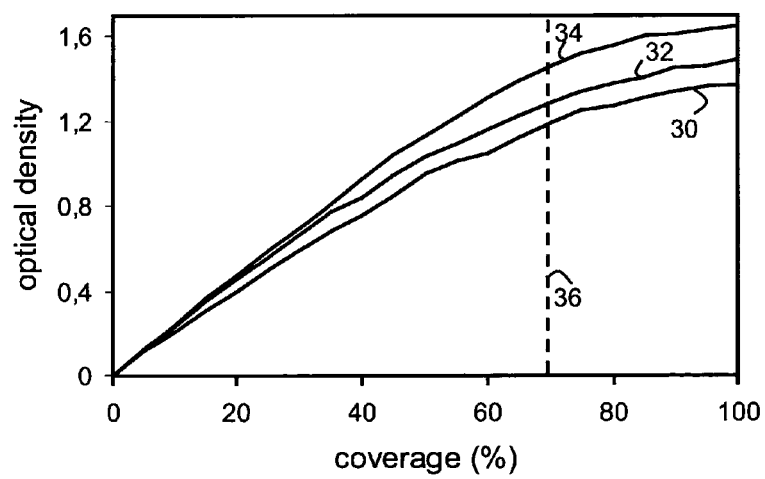
FIG. 2 is a graphic representation illustrating the tonal response of each colorant of a group of colorants used in a printing apparatus, showing the same determined maximum individual area coverage for each colorant.

In addition to the determination of the maximum total area coverage of the media by the colorants, the knowledge of tone scale curves of each colorant is required. The printed test pattern usually also comprises the full tone scales for the primary colorants cyan, magenta and yellow. The full tone range for each colorant is obtained by printing an equally increasing amount of ink per unit area over the full range. For example, patches are printed for each individual colorant with equally increasing area coverage values comprised between 0 and 100% by steps of 5%. The analysis of the printed patches results in measured tonal scale curves such as shown in FIG. 2.

The analysis of the printed tone scales may be based on the measurement of the optical density by a spectrophotometer. A typical tone scale curve for a given colorant presents a non-linear behavior of the measured optical density as a function of the area coverage. In FIG. 2, the tone scale curves 30, 32 and 34 correspond, respectively to the colorants cyan, yellow and magenta.

With the known method (see EP 1168822 A1), the maximum individual area coverage for each colorant is derived by dividing the maximum total area coverage by three and assigning the obtained value to each colorant. Thus, the maximum individual area coverage is the same for the cyan, yellow and magenta inks. In the present example, the maximum individual area coverage, represented by the vertical line 36 in FIG. 2 is equal to a third of 215 percent, i.e. approximately 72 percent. Hence, when printing images for the selected print application, the maximum individual area coverage for each of the colorants may not exceed 72 percent in the present example, and according to the known method.

The knowledge of the tonal curves together with the maximum area coverage for each of the colorant enables one to generate a gamma curve for each colorant. Gamma curves are used later on for the determination of the non-linear transfer functions for converting input values of an image to be printed into modified input values, which are better suited to the reproduction properties of a printing apparatus.

Figure 3:
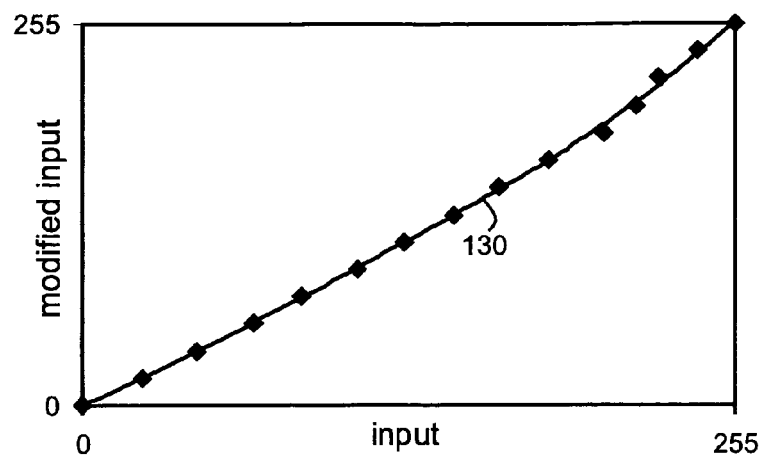
FIG. 3 is a graphic representation illustrating the transfer function for the color channel cyan, obtained from the tonal response of the colorant cyan and from the maximum individual area coverage.

It is indeed necessary to modify input data of an image file to be printed into modified input data due to the non-linearity of the tonal curves. Applying the transfer function to input data of a color channel of an image to be printed enables one to obtain modified input data that are suited for linear rendering by the printing apparatus. In FIG. 3, a gamma curve is illustrated by way of example for the colorant cyan having the tonal curve 30. The gamma curve is represented by the diamond symbols in FIG. 3. In this example, it is supposed that input data range from 0 to 255, which is a typical range of color depth in a digital image. The gamma curve is the inverse of the normalized tone scale function. The normalization is performed by attributing the maximum individual area coverage of 72 percent to the maximum modified input 255 and by attributing the maximum allowed optical density (the measured optical density at 72 percent area coverage) to the maximum input 255.

Alternatively, other functions can be chosen for obtaining a gamma curve. In the example discussed above, the gamma curve is simply the inverse of the normalized tone scale function. This choice leads to a difference in input value being proportional to a difference in printed optical density, whereby the proportionality factor is constant over the input range. However, other choices can be made, which leads to a tonal response curve being non-linear. The function used to obtain the gamma curve from the tonal response can thus be freely chosen. The particular choice influences the shape of the transfer function. In this application, linearization of the tonal response is shown as an example only.

Figure 4:
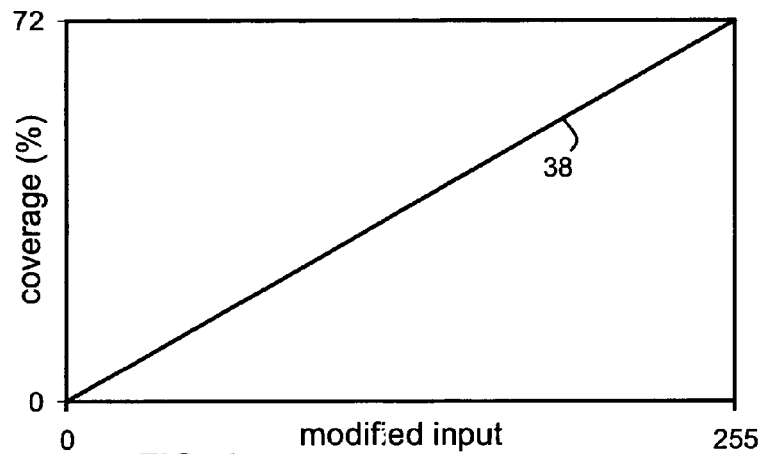
FIG. 4 is a linearized tonal curve used for printing purposes, after the transfer function has been applied to input data of the cyan channel.

Finally, a gamma curve enables one to generate a transfer function to be applied to the input data of a color channel of an image to be printed. The transfer function can be expressed in the form of a mathematical function obtained by a polynomial curve fit of the gamma curve, as is represented in FIG. 3 by the line 130. Alternately, the transfer function can be expressed by a look-up table, obtained for example by interpolation of the points forming the gamma curve. The gamma curve shown in FIG. 3 for the cyan ink thus enables one to determine the transfer function to be applied to input data of the cyan color channel of an image to be printed. When the transfer function represented by the line 130 in FIG. 3 is applied to the input range 0 to 255 of a color channel, this results in modified input data. The modified input data of the cyan channel of an image can thus be rendered linearly by the printing apparatus, as shown in FIG. 4. FIG. 4 represents the area coverage of cyan ink to be applied as a function of the modified input values for the cyan color channel. The curve 38 shown in FIG. 4 is the linearized tonal curve to be used for printing purposes. It has its maximum at a point having the coordinates (255, 72%), in the present example, and according to the known method.

Although in FIG. 3 a gamma curve is shown only for the cyan colorant, the same procedure is carried out for magenta and yellow, each having a different gamma curve. With the known method, the maximum individual area coverage values for the cyan, yellow and magenta colorants are equal. In the example of FIG. 2, they are all equal to 72 percent, being a third of the determined total area coverage. However, with the known method, it has been observed that the interesting parts of the gamut cannot be reached by the printing apparatus, and in particular, some colors are not saturated enough.

The method according to an embodiment of the invention will now be explained by reference to FIG. 8. In step S2, a test pattern is printed. For this purpose, a typical test pattern is used, comprising patches on which equal quantities of each colorant cyan, magenta and yellow are printed in an additive fashion in order to easily determine a maximum total area coverage by the colorants, i.e. the maximum acceptable ink load. The printed test pattern usually also comprises the full tone scales for the primary colorants cyan, magenta and yellow. The full tone range for each colorant is obtained by printing equally increasing amount of ink per unit area over the full range.

In step S4, the maximum total area coverage is determined. This can be done by selecting a patch on which equal quantities of each colorant cyan, magenta and yellow are printed in an additive fashion and which is at the limit of acceptability with respect to cockling, for example. In this way, the maximum total area coverage is determined as being equal to the value of the total area coverage of the particular patch, for example 215%.

Figure 6:
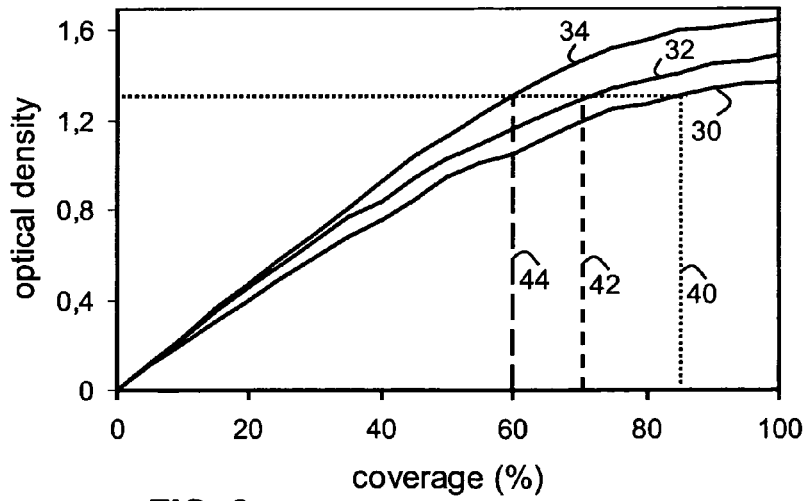
FIG. 6 is a graphic representation illustrating the tonal response of each colorant of a group of colorants used in a printing apparatus, showing the maximum individual area coverage values set according to the method of the present invention.

In step S6, the tonal response of each colorant is measured. The analysis of the printed tone scales may be based on the measurement of the optical density by a spectrophotometer. A typical tone scale curve for a given colorant presents a non-linear behavior of the measured optical density as a function of the area coverage, as shown in FIG. 6. The curves 30, 32 and 34, respectively, are the measured tonal curves of the colorants cyan, yellow and magenta.

Step S8 is the step of setting a maximum individual area coverage for each colorant such that the optical density at the maximum individual area coverage is substantially the same for each colorant of the group and the sum of the maximum individual area coverage values is substantially equal to the maximum total area coverage. The result of step S8 is illustrated in FIG. 6. The determined maximum individual area coverage values for cyan, yellow and magenta, respectively, are illustrated by the vertical lines 40, 42 and 44. The corresponding values for cyan, yellow and magenta are 85%, 70% and 60%, respectively. The sum of the maximum individual area coverage values is substantially equal to the maximum total area coverage, i.e. 215%. As can be seen in FIG. 6, the optical density at the maximum individual area coverage is substantially the same (1.3) for each colorant of the group, as is illustrated by the horizontal dotted line.

A way of carrying out step S8 will now be explained with reference to FIG. 5, which is a table showing the data of FIG. 6, i.e. the measured optical density values (OD) for cyan (C), magenta (M) and yellow (Y) colorants as a function of the area coverage (AC) of the colorant. A possible way of determining the maximum individual area coverage values is to add, for a substantially same given value of the optical density, the corresponding individual area coverage values for the three colorants C, M and Y, and to check whether the sum is equal to 215%. For example, for an optical density value of about 1, the corresponding area coverage values are, respectively, 55%, 50% and 45% for cyan, yellow and magenta and the sum is thus 150%. This is less than 215%. Therefore, another value of the optical density can be tried. The trials are repeated until the sum is substantially equal to 215%. The trial is successful for an optical density of about 1.3, the corresponding area coverage values being, respectively, 85%, 70% and 60% for cyan, yellow and magenta, as is illustrated in FIG. 5 by the circled areas. Alternatively, this procedure can be carried out automatically by a piece of software, based on interpolation and iterative routines.

Once the maximum individual area coverage values are set, in step S10, the gamma curves can be obtained for each colorant. The gamma curve is, for example, the inverse of the normalized tone scale function. The normalization is performed by attributing the maximum individual area coverage to the maximum modified input 255 and by attributing the corresponding optical density to the maximum input 255. In the example, for cyan, the normalization is performed by attributing the area coverage of 85% to the maximum modified input 255 and by attributing the corresponding optical density 1.3 to the maximum input 255. An inverse function is applied to the values of the normalized tone scale, which results in a gamma curve, as illustrated for cyan in FIG. 7 by the diamond symbols. The same procedure can be applied to the yellow colorant. The tone scale function of yellow is normalized by attributing the area coverage of 70% to the maximum modified input 255 and by attributing the corresponding optical density 1.3 to the maximum input 255. The tone scale function of magenta is normalized by attributing the area coverage of 60% to the maximum modified input 255 and by attributing the corresponding optical density 1.3 to the maximum input 255.

Figure 9A:
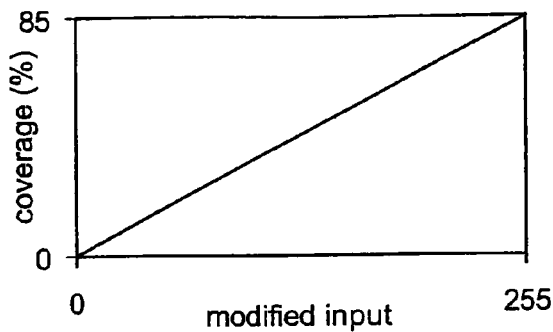
FIGS. 9A, 9B and 9C are linearized tonal curves used for printing purposes, after the transfer functions have been applied to input data of the cyan, yellow and magenta channels, respectively.
Figure 9B:
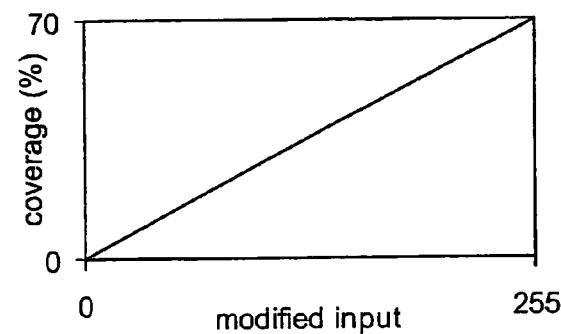
Figure 9C:
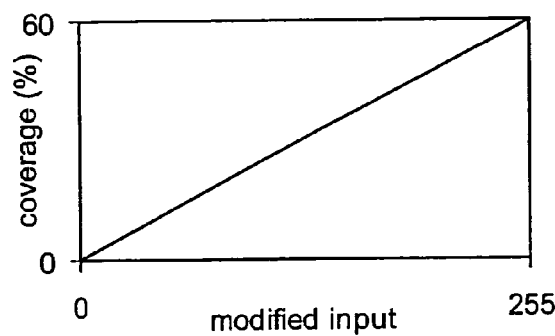

In step S12, the transfer function is generated for each color channel cyan, magenta and yellow. Each gamma curve enables one to generate a transfer function to be applied to the input data of each corresponding color channel. The transfer function can be expressed in the form of a mathematical function obtained by a polynomial curve fit of the gamma curve. Alternately, the transfer function can be expressed by a look-up table, obtained for example by interpolation of the points forming the gamma curve. For example, the gamma curve shown in FIG. 7 enables one to determine the transfer function to be applied to input data of the cyan color channel of an image to be printed, as shown by the line 140 being a polynomial fit of the gamma curve points. When the transfer function is applied to the input range 0 to 255 of a color channel, this results in modified input data as shown in FIG. 7. The modified input data of the cyan channel of an image can thus be rendered linearly by the printing apparatus. A linear relationship is obtained between the modified input values of an image for the color channel cyan and the area coverage of cyan ink to be applied. The linear relationship is illustrated in FIG. 9A for the cyan color channel, with the maximum point now having the coordinates (255, 85%), in accordance with the method of the present invention. For yellow and magenta, respectively, the linear relationship is described by a straight line having its maximum point at the coordinates (255, 70%) and (255, 60%) (see FIGS. 9B and 9C) in accordance with the method of the present invention. The curves shown in FIGS. 9A, 9B and 9C are used for printing purposes.

In the example discussed above, the gamma curve is obtained by applying an inverse function to the tonal curve of each colorant. Another transformation is possible in order to obtain the gamma curve in which case the transfer function has another shape. The gamma curve is a given transformation of the normalized tone scale function. The normalization of the tone scale function is performed in accordance with the present invention. The normalization is performed by attributing the maximum individual area coverage to the maximum modified input 255 and by attributing the corresponding optical density to the maximum input 255. Taking the same values as before, as an example, for cyan, the normalization is performed by attributing the area coverage of 85% to the maximum modified input 255 and by attributing the corresponding optical density 1.3 to the maximum input 255. The normalized tone scale is transformed according to the chosen transformation, which results in a gamma curve. The same procedure is applied to the yellow colorant. The tone scale function of yellow is normalized by attributing the area coverage of 70% to the maximum modified input 255 and by attributing the corresponding optical density 1.3 to the maximum input 255. The tone scale function of magenta is normalized by attributing the area coverage of 60% to the maximum modified input 255 and by attributing the corresponding optical density 1.3 to the maximum input 255. The gamma curve is fitted, or a look-up table is made for generating the transfer function.

Figure 10:
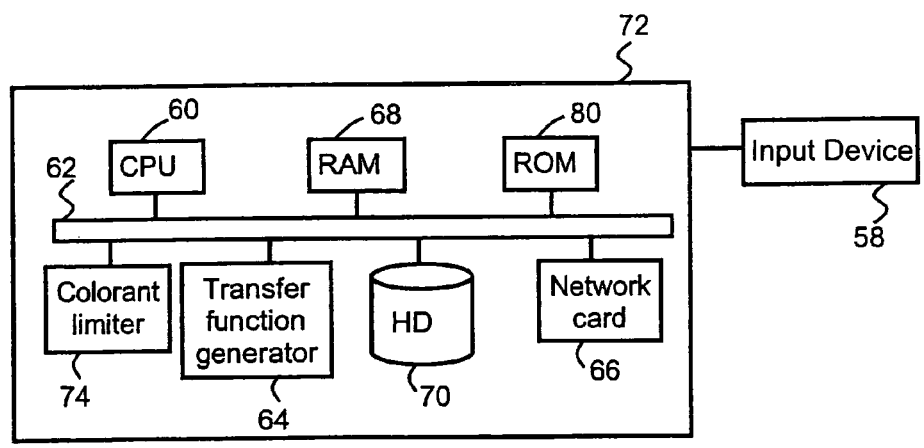
FIG. 10 is a schematic diagram of an apparatus for generating transfer functions according to an embodiment of the present invention.

FIG. 10 is a schematic diagram of an apparatus 72 for generating transfer functions according to an embodiment of the present invention. The apparatus 72 comprises a Central Processing Unit (CPU) 60, a Random Access Memory (RAM) 68, a Read Only Memory (ROM) 80, a hard disk (HD) 70, a network card 66, a colorant limiter unit 74 and a transfer function generator 64. The network card 66 connects the apparatus 74 to a network N and is designed to provide communication with other devices such as workstations. The aforementioned units are interconnected through a bus system 62. The apparatus 72 is further connected to an input device 58 such as a keyboard and a mouse that enables a user to enter commands in order to execute the generation of the transfer functions.

The network card 66 is an example of a receiving device that is adapted to receive data comprising the pre-determined maximum total area coverage and the measured tonal response of each colorant. The data can be determined and measured elsewhere by an operator using other devices, and be sent by the operator to the apparatus 72 via the network N. It could also be any drive adapted to read data submitted by an operator on a data carriage medium, such as a CD-ROM, a floppy diskette, a USB memory stick or the like.

Once received, the data comprising the pre-determined maximum total area coverage and the measured tonal response of each colorant are passed to the hard disk 70. The hard disk 70 is an example of a storage device that stores the data. The data stored on the HD 70 are read out onto the RAM 68 by the CPU 60 as needed.

The colorant limiter 74 can be implemented either as a software component of an operating system running on the apparatus 72 or as a firmware program executed on the CPU 60. The colorant limiter 74 has functions for setting the maximum individual area coverage values such that the optical density at each maximum individual area coverage is substantially the same for each colorant and the sum of the maximum individual area coverage values is substantially equal to the maximum total area coverage. To perform the tasks of setting the maximum individual area coverage values, the colorant limiter 74 is adapted for executing an algorithm that interpolates the values of the measured tonal response of each colorant and applies an iteration routine to the interpolated values of each colorant for setting the maximum individual area coverage values such that the optical density at each maximum individual area coverage is substantially the same for each colorant and the sum of the maximum individual area coverage values is substantially equal to the maximum total area coverage.

The transfer function generator 64 can be implemented either as a software component of an operating system running on the apparatus 72 or as a firmware program executed on the CPU 60. The transfer function generator 64 is adapted for generating a transfer function for each color channel based on the set maximum individual area coverage for the assigned colorant. For example, a transfer function generator is adapted to execute an algorithm that fits a gamma curve for each colorant, the gamma curve being obtained by applying a transformation to the normalized tonal response of the assigned colorant. The transformation applied to the normalized tonal response of the colorant may be an inverse function.

The invention has been described for application to a printing system using a group of primary colorants consisting of cyan, magenta and yellow. Most of the printers are also provided with black ink, which is frequently used to print text. Black colorant is also used in techniques such as UCR (Undercolor Removal) and GCR (Grey Component Replacement). Black ink does not always need to be limited, because used in relative small quantities. However, in the event that a black ink limitation is needed, the procedure for limiting the black colorant is usually carried out independently from the ink reduction performed for the basic colorants.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of generating transfer functions to be applied to input data of an image to be printed by a printing apparatus using a group of colorants, each colorant being assigned to the rendering of a distinct color channel, said method comprising the steps of:
   determining a maximum total area coverage;
   measuring the tonal response of each colorant;
   determining an individual maximum coverage value for each colorant by
   (a) establishing an individual coverage value for each colorant at one and same trial value of the optical density,
   (b) replacing the one trial value in the step (a) with another trial value and repeating the step (a) until a sum of the individual coverage values for each colorant at a current trial value of the optical density is substantially the same as the maximum total area coverage value, and
   (c) setting the individual coverage value for each colorant at the current trial value of the optical density as the individual maximum coverage value for each colorant such that the optical density at the individual maximum coverage value for each colorant is the same; and
   generating a transfer function for each color channel based on the set maximum individual area coverage for the assigned colorant.

2. The method of generating transfer functions according to claim 1, wherein the step of determining a maximum total area coverage further comprises the step of judging the aspect of a printed test pattern comprising patches printed with increasing total area coverage values.

3. The method of generating transfer functions according to claim 2, wherein the step of measuring the tonal response of each colorant further comprises the step of measuring the optical density of patches printed with increasing individual area coverage values.

4. The method of generating transfer functions according to claim 1, wherein the step of measuring the tonal response of each colorant further comprises the step of measuring the optical density of patches printed with increasing individual area coverage values.

5. The method of generating transfer functions according to claim 1, wherein the transfer function for each color channel is obtained by fitting a gamma curve of the assigned colorant, said gamma curve being obtained by applying a transformation to a normalized tonal response of the assigned colorant.

6. The method of generating transfer functions according to claim 5, wherein the transformation applied to the normalized tonal response of the assigned colorant is an inverse function.

7. An apparatus for generating transfer functions to be applied to input data of an image to be printed by a printing apparatus using a group of colorants, each colorant being assigned to the rendering of a distinct color channel, said apparatus comprising:
   a receiving device;
   a storing device;
   a reading device, the receiving device, storing device and reading device receiving, storing and reading data, respectively, the data comprising a pre-determined maximum total area coverage and a measured tonal response of each colorant;
   a colorant limiter that determines an individual maximum coverage value for each colorant by establishing an individual coverage value for each colorant at one and same trial value of the optical density, replacing the one trial value with another trial value and repeating establishing the individual coverage value for each colorant at the another trial value of the optical density until a sum of the individual coverage values for each colorant at a current trial value of the optical density is substantially the same as the maximum total area coverage value, and setting the individual coverage value for each colorant at the current trial value of the optical density as the individual maximum coverage value for each colorant such that the optical density at the individual maximum coverage value for each colorant is the same; and
   a transfer function generator that generates a transfer function for each color channel based on the set maximum individual area coverage for the assigned colorant.

8. The apparatus for generating transfer functions according to claim 7, wherein the colorant limiter executes an algorithm interpolating the values of the measured tonal response of each colorant and applies an iteration routine to the interpolated values of each colorant.

9. The apparatus for generating transfer functions according to claim 8, wherein the transfer function generator executes an algorithm for fitting a gamma curve of each colorant to generate the transfer function of the corresponding color channel, the gamma curve being obtained by applying a transformation to the normalized tonal response of the colorant.

10. The apparatus for generating transfer functions according to claim 9, wherein the transformation applied to the normalized tonal response of the colorant is an inverse function.

11. The apparatus for generating transfer functions according to claim 8, wherein the transfer function generator executes an algorithm to produce a look-up table obtained by interpolation of the points of a gamma curve of each colorant to generate the transfer function of the corresponding color channel, the gamma curve being obtained by applying a transformation to the normalized tonal response of the colorant.

12. The apparatus for generating transfer functions according to claim 11, wherein the transformation applied to the normalized tonal response of the colorant is an inverse function.

13. The apparatus for generating transfer functions according to claim 7, wherein the transfer function generator executes an algorithm for fitting a gamma curve of each colorant to generate the transfer function of the corresponding color channel, the gamma curve being obtained by applying a transformation to the normalized tonal response of the colorant.

14. The apparatus for generating transfer functions according to claim 13, wherein the transformation applied to the normalized tonal response of the colorant is an inverse function.

15. The apparatus for generating transfer functions according to claim 7, wherein the transfer function generator executes an algorithm to produce a look-up table obtained by interpolation of the points of a gamma curve of each colorant to generate the transfer function of the corresponding color channel, the gamma curve being obtained by applying a transformation to the normalized tonal response of the colorant.

16. The apparatus for generating transfer functions according to claim 15, wherein the transformation applied to the normalized tonal response of the colorant is an inverse function.

17. A non-transitory computer-readable medium storing computer-executable instructions causing at least one process unit to perform the generation of transfer functions to be applied to the input data of an image to be printed by a printing apparatus using a group of colorants, each colorant being assigned to the rendering of a distinct color channel, said program comprising: instructions for receiving, storing and reading data comprising a pre-determined maximum total area coverage and a measured tonal response of each colorant; colorant limiting instructions for determining an individual maximum coverage value for each colorant by (a) establishing an individual coverage value for each colorant at one and same trial value of the optical density, (b) replacing the one trial value in the step (a) with another trial value and repeating the step (a) until a sum of the individual coverage values for each colorant at a current trial value of the optical density is substantially the same as the maximum total area coverage value, and (c) setting the individual coverage value for each colorant at the current trial value of the optical density as the individual maximum coverage value for each colorant such that the optical density at the individual maximum coverage value for each colorant is the same; and instructions for generating a transfer function for each color channel based on the set maximum individual area coverage for the assigned colorant.

* * * * *